US011979817B2

(12) United States Patent
Jennings (10) Patent No.: US 11,979,817 B2
(45) Date of Patent: May 7, 2024

(54) DEVICE AND METHOD FOR MONITORING SOCIAL DISTANCING AND CONTACT TRACING

(71) Applicant: ARRIS Enterprises LLC, Suwanee, GA (US)

(72) Inventor: William Jennings, Brookhaven, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 302 days.

(21) Appl. No.: 17/490,125

(22) Filed: Sep. 30, 2021

(65) Prior Publication Data

US 2022/0182921 A1 Jun. 9, 2022

Related U.S. Application Data

(60) Provisional application No. 63/122,662, filed on Dec. 8, 2020.

(51) Int. Cl.
*H04W 4/00* (2018.01)
*H04W 48/10* (2009.01)
*H04W 48/16* (2009.01)
*H04W 76/14* (2018.01)

(52) U.S. Cl.
CPC .......... *H04W 48/10* (2013.01); *H04W 48/16* (2013.01); *H04W 76/14* (2018.02)

(58) Field of Classification Search
CPC ...... H04W 48/10; H04W 48/16; H04W 76/14
USPC ........................................................ 370/329
See application file for complete search history.

(56) References Cited

U.S. PATENT DOCUMENTS

| | | | | |
|---|---|---|---|---|
| 8,520,695 B1* | 8/2013 | Rubin | .................. | H04W 72/30 370/445 |
| 11,082,809 B1* | 8/2021 | Burowski | ............. | G01S 13/765 |
| 11,671,530 B2* | 6/2023 | Ledvina | ............ | H04M 1/72457 455/418 |
| 2013/0282438 A1* | 10/2013 | Hunter | ............... | G06Q 30/0201 705/7.32 |
| 2014/0279101 A1* | 9/2014 | Duplan | .................. | G06Q 20/40 705/18 |
| 2016/0088587 A1* | 3/2016 | Chen | .................... | H04M 19/047 455/41.2 |
| 2017/0094588 A1* | 3/2017 | Naqvi | ..................... | H04W 4/80 |
| 2017/0111510 A1* | 4/2017 | Cardona | ................. | H04W 4/02 |
| 2017/0228935 A1* | 8/2017 | Foster | .................... | G01C 21/20 |
| 2017/0243485 A1* | 8/2017 | Rubin | ..................... | H04W 4/46 |
| 2019/0074991 A1* | 3/2019 | Peterson | ........... | H04L 12/2829 |
| 2019/0273767 A1* | 9/2019 | Nelson | ............... | H04M 7/0027 |
| 2020/0106877 A1* | 4/2020 | Ledvina | ................ | H04W 8/183 |
| 2022/0101294 A1* | 3/2022 | Mahanti | .................. | G07G 1/14 |
| 2022/0174456 A1* | 6/2022 | Kumar | .................... | H04W 4/33 |
| 2022/0353644 A1* | 11/2022 | Kumar | .................... | H04W 4/30 |

* cited by examiner

*Primary Examiner* — Marceau Milord
(74) *Attorney, Agent, or Firm* — Wenderoth, Lind & Ponack, L.L.P.

(57) ABSTRACT

Wireless device for use with a second wireless device in a communication network to: detect the unique identifier broadcast from the second wireless device; determine a distance from the second wireless device based on the unique identifier broadcast; and instruct the indicator to provide an alert when the distance from the second wireless device is less than a predetermined distance threshold for a predetermined period of time.

12 Claims, 4 Drawing Sheets

DEVICE AND METHOD FOR MONITORING SOCIAL DISTANCING AND CONTACT TRACING

BACKGROUND

Embodiments of the invention relate to a device and method for monitoring social distancing and contact tracing in a controlled environment.

SUMMARY

Aspects of the present invention are drawn to a wireless device for use with a second wireless device, the second wireless device being configured to broadcast a unique identifier. The wireless device includes an indicator configured to provide an indication to a user, a memory, and a processor configured to execute instructions stored on the memory to cause the wireless device to: detect the unique identifier broadcast from the second wireless device; determine a distance from the second wireless device based on the unique identifier broadcast; and instruct the indicator to provide an alert when the distance from the second wireless device is less than a predetermined distance threshold for a predetermined period of time.

In some embodiments, the processor is configured to execute instructions stored on the memory to additionally cause the wireless device to store the unique identifier from the unique identifier broadcast when the distance from the second wireless device is less than the predetermined distance threshold for the predetermined period of time.

In some embodiments, the processor is configured to execute instructions stored on the memory to additionally cause the wireless device to determine a contact period of time for which the second wireless device is less than the predetermined distance threshold when the distance from the second wireless device is less than the predetermined distance threshold for the predetermined period of time, and store data representing the contact period time into the memory.

In some embodiments, the processor is configured to execute instructions stored on the memory to additionally cause the wireless device to transmit a contact notification including association information associating with the wireless device to the user and contact information associating the wireless device with the second wireless device.

Other aspects of the present invention are drawn to a method of using a wireless device with a second wireless device, the second wireless device being configured to broadcast a unique identifier. The method includes: detecting, via a processor configured to execute instructions stored on a memory, the unique identifier broadcast from the second wireless device; determining, via the processor, a distance from the second wireless device based on the unique identifier broadcast; and instructing, via the processor, an indicator to alert to the user when the distance from the second wireless device is less than a predetermined distance threshold for a predetermined period of time.

In some embodiments, the method further includes storing, via the processor and into the memory, the unique identifier from the unique identifier broadcast when the distance from the second wireless device is less than a predetermined distance threshold for a predetermined period of time.

In some embodiments, the method further includes: determining, via the processor, a contact period of time for which the second wireless device is less than the predetermined distance threshold when the distance from the second wireless device is less than the predetermined distance threshold for the predetermined period of time; and storing, via the processor, data representing the contact period time into the memory.

In some embodiments, the method further includes transmitting, via the processor, a contact notification including association information associating the wireless device to the user and contact information associating the wireless device with the second wireless device.

Other aspects of the present invention are drawn to a non-transitory, computer-readable media having computer-readable instructions stored thereon, the computer-readable instructions being capable of being read by a wireless device for use with a second wireless device, the second wireless device being configured to broadcast a unique identifier, wherein the computer-readable instructions are capable of instructing the wireless device to perform the method including: detecting, via a processor configured to execute instructions stored on a memory, the unique identifier broadcast from the second wireless device; determining, via the processor, a distance from the second wireless device based on the unique identifier broadcast; and instructing, via the processor, an indicator to provide an indication to a user when the distance from the second wireless device is less than a predetermined distance threshold for a predetermined period of time.

In some embodiments, the computer-readable instructions are capable of instructing the wireless device to perform the method further comprising storing, via the processor and into the memory, the unique identifier from the unique identifier broadcast when the distance from the second wireless device is less than a predetermined distance threshold for a predetermined period of time.

In some embodiments, the computer-readable instructions are capable of instructing the wireless device to perform the method further including: determining, via the processor, a contact period of time for which the second wireless device is less than the predetermined distance threshold when the distance from the second wireless device is less than the predetermined distance threshold for the predetermined period of time; and storing, via the processor, data representing the contact period time into the memory.

In some embodiments, the computer-readable instructions are capable of instructing the wireless device to perform the method further including transmitting, via the processor, a contact notification including association information associating the wireless device to the user and contact information associating the wireless device with the second wireless device.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
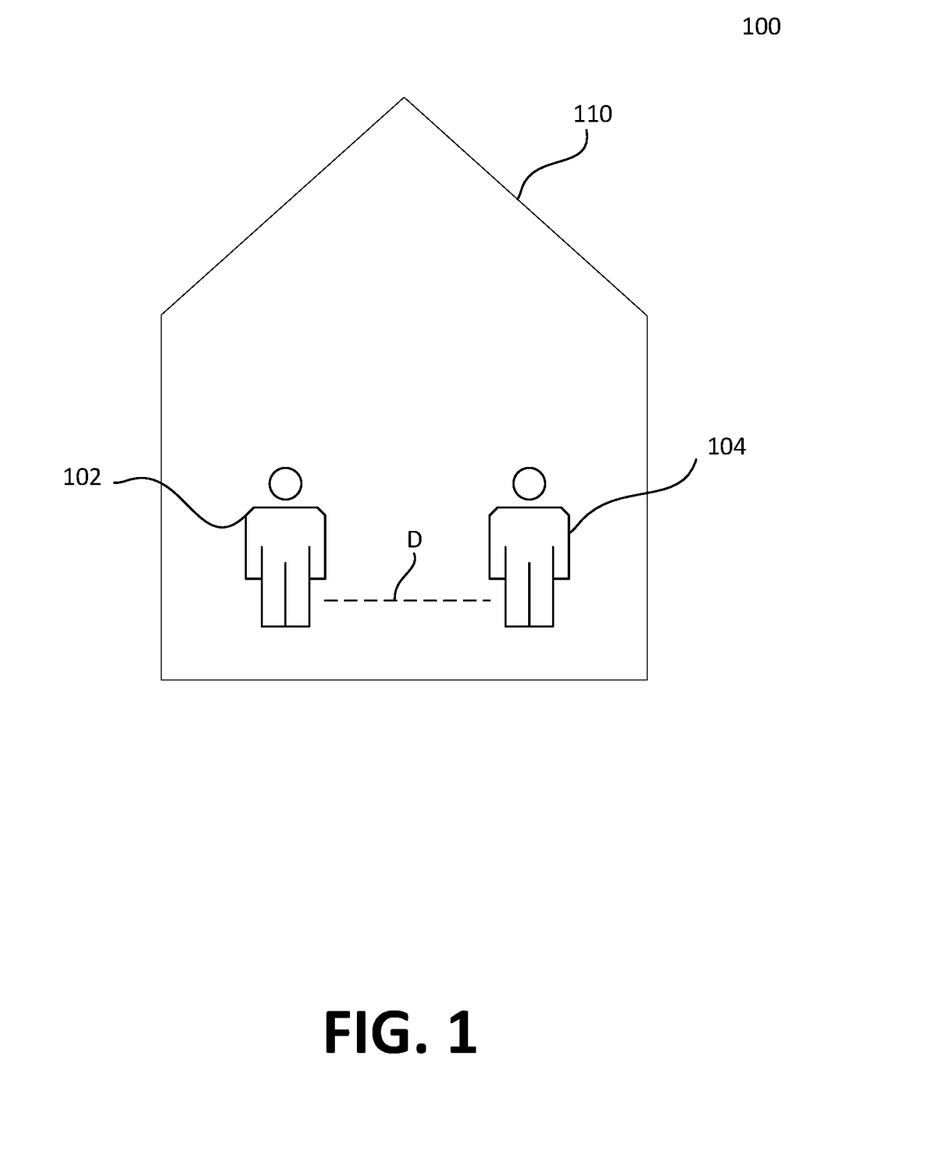
FIG. 1 illustrates a communications network at a time $t_0$.

FIG. 1 illustrates a social environment in a communication network 100 at time $t_0$. Communication network 100 includes an office building 110 which includes a plurality of occupants, a sample of which is illustrated as occupants 102 and 104. While office building 110, occupant 102 and occupant 104 are within a distance D from one another. Throughout the day, distance D may vary as occupant 102 and occupant 104 move within communication network 100.

As the world is currently experiencing a COVID-19 pandemic, it is crucial to avoid being in close contact with another person for a prolonged period of time to minimize contacting and spreading of the virus. As presented in FIG. 1, when there is a large group of people working inside an office building, it is impossible for an individual to try to avoid being in close contact with others in the same office building. Additionally, when there are many people in an office building, it is difficult for an individual to keep track of people with whom he/she comes in close contact with on a day-to-day basis.

What is needed is a system and method for monitoring social distancing and contact tracing of an individual while inside an office building when there are others present in the same building.

A system and method in accordance with the present disclosure monitors social distancing and contact tracing of an individual in an office building when there are others present in the same building.

In accordance with the present disclosure, the invention closely and constantly monitors the distance of an individual to another person when inside an office building. When the individual reaches a predetermined distance from another individual for a predetermined period of time, the invention will alert both individuals and start recording the information related to both individuals and contact date and time, and then transmit the information to a database server. This information will be crucial for backtracking and identifying people who are in contact with the individual in a certain period of time.

An example system and method for monitoring social distancing and contact tracing of an individual in accordance with aspects of the present disclosure will now be described in greater detail with reference to FIGS. 2-4.

Figure 2:
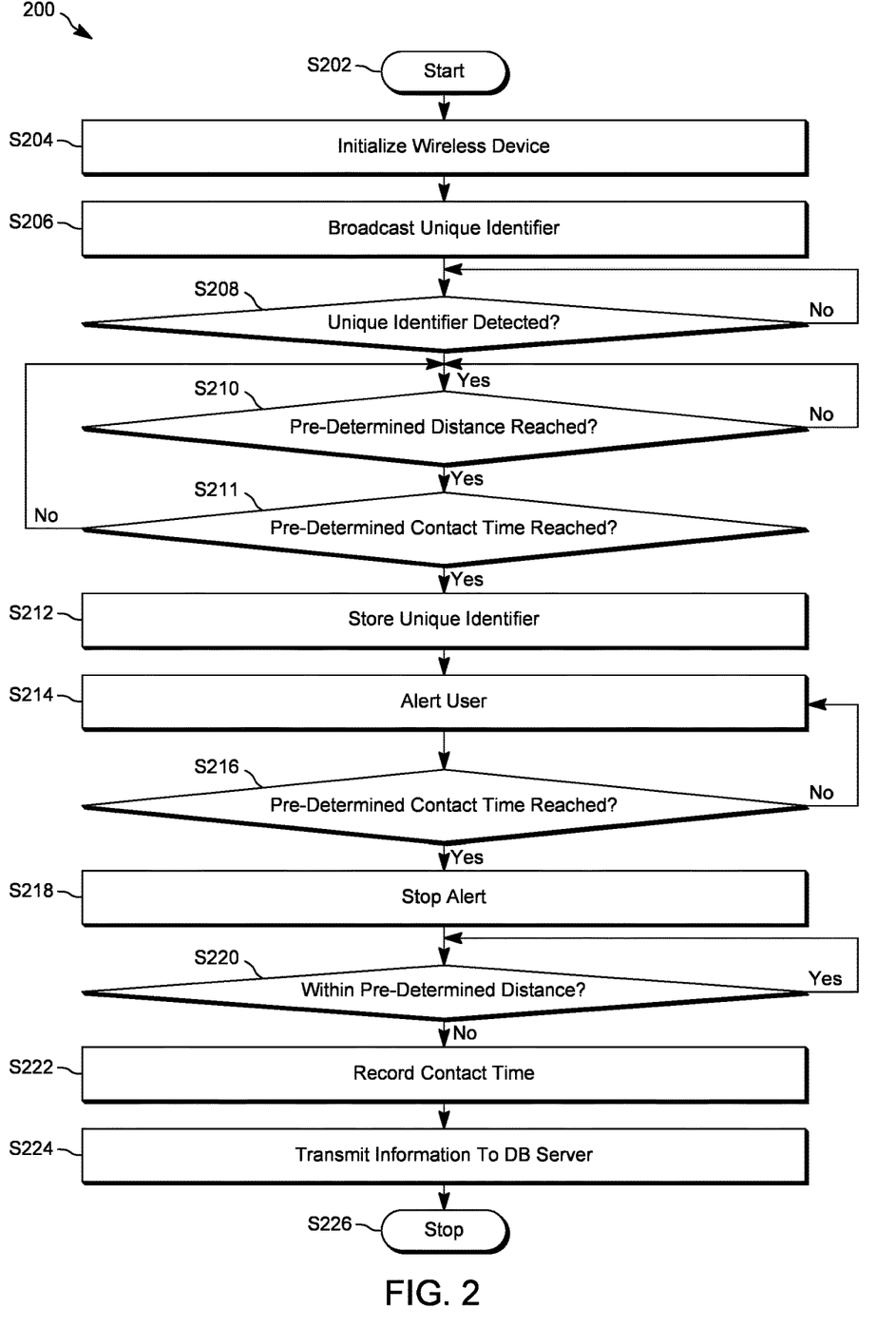
FIG. 2 illustrates an example method for monitoring and controlling social distancing and contact tracing in an office building, in accordance with aspects of the current disclosure.

FIG. 2 illustrates an example algorithm 200 for monitoring social distancing and contact tracing of an individual in a communication network, in accordance with aspects of the present disclosure.

As shown in FIG. 2, algorithm 200 starts (S202) and a new wireless device is initialized (S204). This will be further described with additional reference to FIG. 3.

Figure 3:
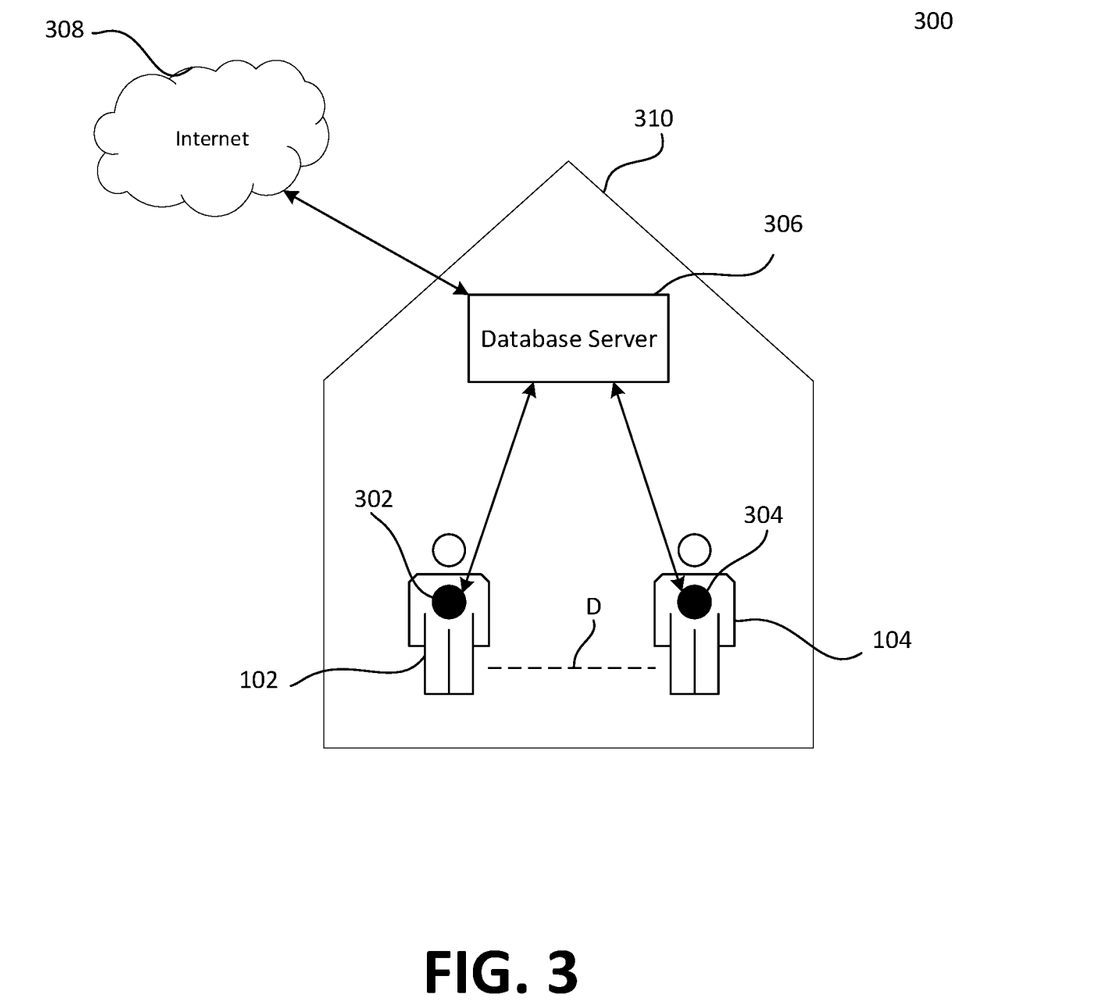
FIG. 3 illustrates a communications network at a time $t_1$, in accordance with aspects of the current disclosure.

FIG. 3 illustrates a communication network 300 at time t1, in accordance with aspects of the current disclosure.

As shown in FIG. 3, communication network 300 includes an office building 310 which includes a plurality of occupants, a sample of which are illustrated as occupants 102 and 104, a database server 306, and an Internet 308, a plurality of wireless devices, a sample of which are illustrated as a wireless device 302 located on occupant 102 and a wireless device 304 located on occupant 104.

As illustrated in FIG. 3, as both occupants 102 and 104 work inside office building 310 throughout day, they are within a distance D from one another. In accordance with the present disclosure, distance D will be constantly measured by wireless devices 302 and 304 throughout the day while both occupants 102 and 104 are inside office building 310 to determine the contact based on a pre-determined distance (i.e. 6 feet). Each wireless device has a unique ID, non-limiting examples of which include a MAC address and serial number, and is initialized with unique information of the individual who carries it, such as name, phone number, and employee ID.

Figure 4:
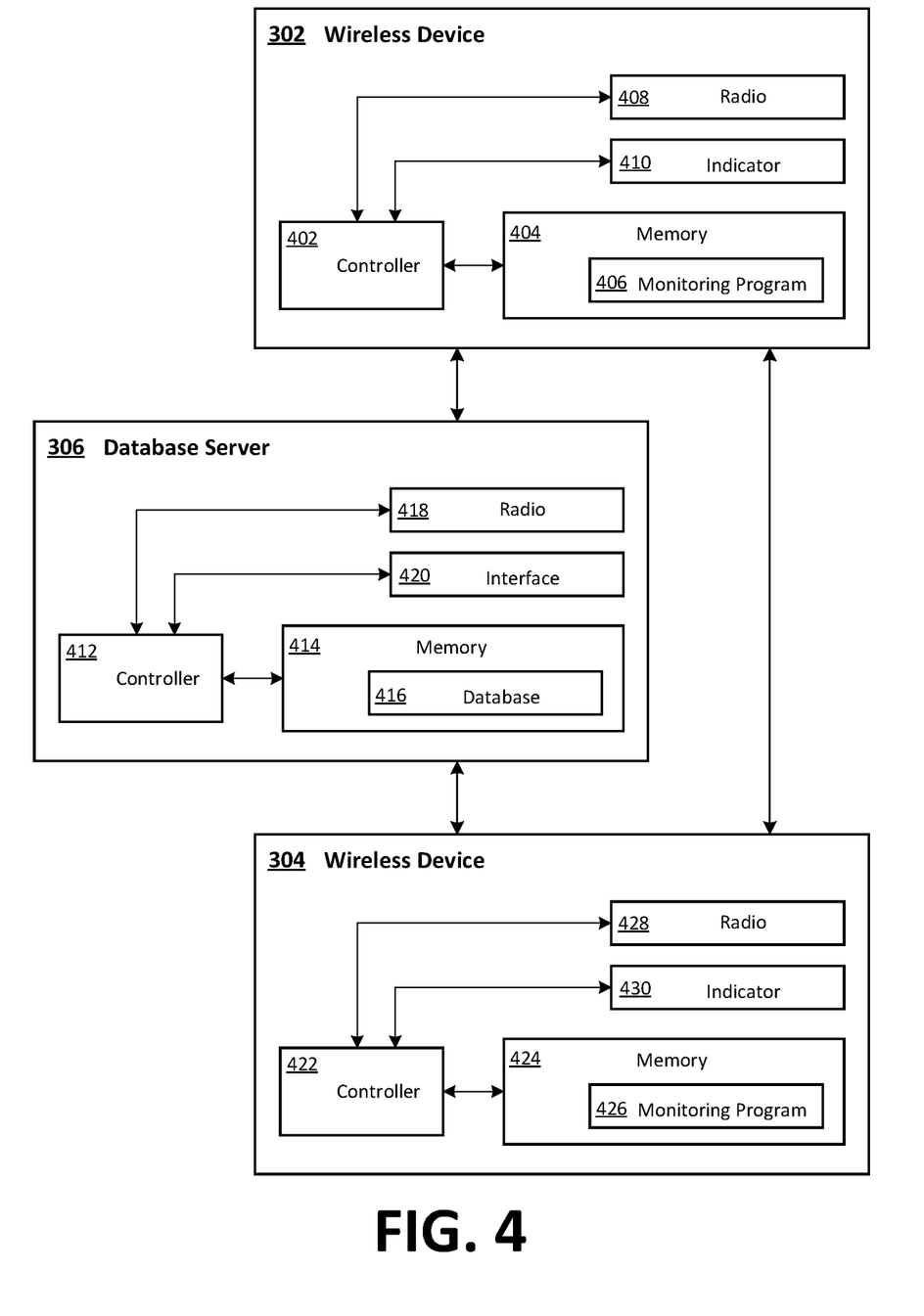
FIG. 4 illustrates an exploded view of the wireless devices and database server of FIG. 3, in accordance with aspects of the current disclosure.

FIG. 4 illustrates an exploded view of wireless devices 302 and 304 and database server 306 of FIG. 3.

As shown in FIG. 4, wireless device 302 includes: a controller 402; a memory 404, which has stored therein a monitoring program 406; a radio 408; and an indicator 410.

In this example, controller 402, memory 404, radio 408, and indicator 410 are illustrated as individual devices. However, in some embodiments, at least two of controller 402, memory 404, radio 408, and indicator 410 may be combined as a unitary device. Whether as individual devices or as combined devices, controller 402, memory 404, radio 408, and indicator 410 may be implemented as any combination of an apparatus, a system and an integrated circuit. Further, in some embodiments, at least one of controller 402, memory 404, and indicator 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of wireless devices 302 and 304 in accordance with the embodiments described in the present disclosure.

Memory 404 can store various programming, and user information such as name, phone number, employee ID, and monitoring program 406. As will be described in greater detail below, monitoring program includes instructions to be executed by controller 402 to cause wireless device 302 to detect a unique identifier broadcast from wireless device 304, to determine a distance from wireless device 304 based on the unique identifier broadcast, and instruct indicator 410 to provide an alert when the distance from wireless device 304 is less than a predetermined distance threshold for a predetermined period of time.

Further, as will be described in greater detail below, in some embodiments, monitoring program includes instructions to be executed by controller 402 to cause wireless device 302 to store the unique identifier from the unique identifier broadcast when the distance from wireless device 304 is less than the predetermined distance threshold for the predetermined period of time. Still further, in some of these embodiments, as will be described in greater detail below, monitoring program includes instructions to be executed by controller 402 to cause wireless device 302 to determine a contact period of time for which wireless device 304 is less than the predetermined distance threshold when the distance from wireless device 304 is less than the predetermined distance threshold for the predetermined period of time, and store data representing the contact period time into memory 414.

Additionally, as will be described in greater detail below, in some embodiments, monitoring program includes instructions to be executed by controller 402 to cause wireless device 302 to transmit a contact notification including association information associating wireless device 302 to user 102 and contact information associating wireless device 302 with wireless device 304.

Indicator 410 can include one or more audio/visual component such as a buzzer or a LED circuit to produce an audio and/or visual alert to the user. Radio 408, (and preferably two or more radios), may also be referred to as a radio transceiver/wireless communication circuit to implement a wireless connection in accordance with any Bluetooth protocols, Bluetooth Low Energy (BLE), and is operable to communicate with wireless devices 302 and 304 and with database server 306. Wireless devices 302 and 304 can also be equipped with other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Database server 306 includes: a controller 412; a memory 414, which has stored therein a database 416; at least one radio, a sample of which is illustrated as a radio 418; and an interface circuit 420.

In this example, controller 412, memory 414, radio 418, and interface circuit 420 are illustrated as individual devices. However, in some embodiments, at least two of controller 412, memory 414, radio 418, and interface circuit 420 may be combined as a unitary device. Whether as individual devices or as combined devices, controller 412, memory 414, radio 418, and interface circuit 420 may be implemented as any combination of an apparatus, a system and an integrated circuit. Further, in some embodiments, at least one of controller 412, memory 414 and interface circuit 420 may be implemented as a computer having non-transitory computer-readable media for carrying or having computer-executable instructions or data structures stored thereon.

Controller 412 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the database server 306 in accordance with the embodiments described in the present disclosure.

Memory 414 can store various programming, and user content, and data. Memory 414 contains a database 416 to store all information receive from wireless devices for all contact recordings occur in office building 310 (refer to FIG. 3). Each contact recording may contain: a unique identifier of the transmitted wireless device, such as Bluetooth MAC address, a unique identifier of the second wireless device which was in contacted with the transmitted wireless device and date and time stamp when the contact happened.

Interface circuit 420 can include one or more connectors, such as RF connectors, or Ethernet connectors, and/or wireless communication circuitry, such as 5G circuitry and one or more antennas. Through interface circuit 420, database server 306 receives an input signal, including data (such as name, phone number, and employee ID) from any user when initializing the wireless device and can send data to any user when requesting for providing record of contacts.

Radio 418 (and preferably two or more radios), may also be referred to as a wireless communication circuit, such as a Wi-Fi WLAN interface radio transceiver and is operable to communicate with wireless devices 302 and 304. Radio 418 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Database server 306 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

As shown in FIG. 4, wireless device 304 includes: a controller 422; a memory 424, which has stored therein a monitoring program 426; a radio 428; and an indicator 430.

In this example, controller 422, memory 424, radio 428, and indicator 430 are illustrated as individual devices. However, in some embodiments, at least two of controller 422, memory 424, radio 428, and indicator 430 may be combined as a unitary device. Whether as individual devices or as combined devices, controller 422, memory 424, radio 428, and indicator 430 may be implemented as any combination of an apparatus, a system and an integrated circuit. Further, in some embodiments, at least one of controller 422, memory 424, and indicator 430 may be implemented as a computer having non-transitory computer-readable media for carrying or having computer-executable instructions or data structures stored thereon.

Controller 422 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of wireless devices 304 and 302 in accordance with the embodiments described in the present disclosure.

Memory 424 can store various programming, and user information such as name, phone number, employee ID, and monitoring program 426. As will be described in greater detail below, monitoring program includes instructions to be executed by controller 422 to cause wireless device 304 to detect a unique identifier broadcast from wireless device 302, to determine a distance from wireless device 302 based on the unique identifier broadcast, and instruct indicator 430 to provide an alert when the distance from wireless device 302 is less than a predetermined distance threshold for a predetermined period of time.

Further, as will be described in greater detail below, in some embodiments, monitoring program includes instructions to be executed by controller 422 to cause wireless device 304 to store the unique identifier from the unique identifier broadcast when the distance from wireless device 302 is less than the predetermined distance threshold for the predetermined period of time. Still further, in some of these embodiments, as will be described in greater detail below, monitoring program includes instructions to be executed by controller 422 to cause wireless device 304 to determine a contact period of time for which wireless device 302 is less than the predetermined distance threshold when the distance from wireless device 302 is less than the predetermined distance threshold for the predetermined period of time, and store data representing the contact period time into memory 414.

Additionally, as will be described in greater detail below, in some embodiments, monitoring program includes instructions to be executed by controller 422 to cause wireless device 304 to transmit a contact notification including association information associating wireless device 304 to user 102 and contact information associating wireless device 304 with wireless device 302.

Indicator 430 can include one or more audio/visual component such as a buzzer or a LED circuit to produce an audio and/or visual alert to the user. Radio 428, (and preferably two or more radios), may also be referred to as a radio transceiver/wireless communication circuit to implement a wireless connection in accordance with any Bluetooth protocols, Bluetooth Low Energy (BLE), and is operable to communicate with wireless devices 304 and 302 and with database server 302. Wireless devices 304 and 302 can also be equipped with other short range protocols that operate in accordance with a wireless technology standard for exchanging data over short distances using any licensed or unlicensed band such as the CBRS band, 2.4 GHz bands, 5

GHz bands, 6 GHz bands, or 60 GHz bands, RF4CE protocol, ZigBee protocol, Z-Wave protocol, or IEEE 802.15.4 protocol.

Returning to FIG. 2, once the wireless device has been initialized (S204), it automatically activates and starts broadcasting its unique identifier (S206). This will be further discussed with reference to FIG. 3.

As shown in FIG. 3, occupant 102 has initialized wireless device 302 and carries wireless device 302 while inside office building 310. Occupant 104 also has initialized wireless device 304 and carries wireless device 304 while inside communication network 300. Both wireless devices 302 and 304 are constantly broadcasting their unique identifiers as the two occupants, 102 and 104, carry them throughout the day.

Returning to FIG. 2, while constantly broadcasting its unique identifier (S206), the wireless device also listens to other broadcasting messages from other wireless devices (S208). If it does not detect any other broadcasting messages with a unique identifier from other wireless devices (N at S208), it will continue to broadcast its unique identifier and listen to other broadcast messages. However, if it detects a unique identifier from second wireless device (Y at S208), it will determine whether the predetermined distance from the second wireless device has been reached (S210). For example, as shown in FIG. 3, as occupants 102 and 104 mobilize within communication network 300 throughout the day, at some point, they will be close to one another such that wireless devices 302 and 304 detect unique identifier broadcast messages from one another. Once wireless devices 302 and 304 detect each other, they will start to determine if the predetermined distance has been reached.

Returning to FIG. 2, as the wireless device determines whether the predetermined distance from the second wireless device has been reached (S210), if the predetermined distance is not reached (N at S210), then the wireless device continues to monitor its distance from the second wireless device (return to S210). However, if the wireless device detects that its distance from the second wireless device has reached the predetermined distance (Y at S210), then the wireless device then determines whether the wireless device remains the predetermined distance from the second wireless device for a pre-determined contact time period (S211). For example as shown in FIG. 4, memory 404 of wireless device has a predetermined time period stored therein.

Controller 402 may execute instructions in monitoring program 406 to start a timer based on the predetermined time period stored within memory 404. The predetermined time period is set to separate contact instances that are less likely to transmit a communicable disease. For example, just passing someone in a hallway may result in a contact period of about 2-3 seconds, which is less likely to spread a communicable disease. On the other hand, working next to a person might have a contact period of on the order of minutes, which is more likely to spread a communicable disease. In a non-limiting example embodiment, the predetermined time period may be 6 minutes. In other words, as shown in FIG. 3, if wireless device 302 of person 102 is within the predetermined distance of wireless device 304 of person 104 for 6 minutes, then such a contact should be registered because such a time period might be determined to likely transmit a communicable disease.

Returning to FIG. 2, if it is determined that the pre-determined contact time has not been reached (N at S211), then it is again determined whether the pre-determined distance has been reached (return to S210). For example, as shown in FIG. 3, if person 102 passes person 104 in a hallway, wherein wireless device 302 of person 102 is within the predetermined distance of wireless device 304 of person 104 for about 4 seconds, then wireless device 302 of person 302 will wait until another wireless device is detected.

Returning to FIG. 2, if it is determined that the pre-determined contact time has been reached (Y at S211), then the unique identifier received from the second wireless device will be recorded (S212). For example, as shown in FIG. 3, at one point during the day, both occupant 102 and 104 come in contact with one another, for example, such as when both are attending the same meeting. When occupant 102 comes within a predetermined distance from occupant 104 (i.e. 6 feet), wireless device 302 detects the unique identifier from the broadcast message transmitted from wireless device 304, and wireless device 304 detects the unique identifier from the broadcast message transmitted from wireless device 302. Then both wireless devices 302 and 304 record and save the unique identifier received from the broadcast messages of one another into memory.

Returning to FIG. 2, once the wireless device stores the unique identifier received from the second wireless device (S212), it alerts the user (S214). For example, as shown in FIG. 3, after wireless devices 302 and 304 stored the unique identifiers received from one another, wireless devices 302 and 304 alert occupants 102 and 104 that they are in close contact with one another. For example, returning to FIG. 4, monitoring program 406 sends an instruction to indicator 410 to audibly (as with a buzzing sound) or visually (as with an LED flashing) to alert both occupants 102 and 104.

Returning to FIG. 2, after the wireless device alerts the user (S214), it also determines if the time in close contact with the second wireless device has reached the predetermined time (i.e. 30 seconds) (S216). If the time in close contact with the second wireless device has not reached the predetermined time, then the wireless device continues to alert the user (N at S216). However, if the time in close contact reaches the predetermined time (Y at S216), then the wireless device will stop alerting the user (S218). For example, returning to FIG. 3, while attending the same meeting, both occupants 102 and 104 are getting constant alerts, such as an audio buzzer going off every 10 seconds, from wireless devices, 302 and 304. Once the contact time has reached a predetermined time (i.e. 30 seconds), both wireless devices will stop the alerts.

Returning to FIG. 2, after the wireless device stops alerting the user (S218), the wireless device determines if it is still within the predetermined distance from the second wireless device (S220). If it is still within the predetermined distance from the second wireless device (Y at S220), the wireless device will continue to monitor its distance from the second wireless device. However, if the wireless device is no longer within the predetermined distance from the second wireless device (N at S220), then it will record the contact duration. For example, returning to FIG. 3, after the meeting has concluded and both occupants 102 and 104 are parting from one another with a distance greater than the predetermined distance (i.e. 6 feet), both wireless devices 302 and 304 will record the duration for which both occupants 102 and 104 are within the predetermined distance from one another. If the meeting was 30 minutes, then both wireless devices will record the contact time as 30 minutes and save it into memory 404, as shown in FIG. 4.

Returning to FIG. 2, after the wireless device records the contact time (S222), the wireless device then transmits the recorded information to the database server (S224). For example, returning to FIG. 3, after wireless devices 302 and 304 each record the contact time that occupants 102 and 104 were attending the meeting and within the predetermined distance from one another, both wireless devices 302 and 304 then transmit the recorded information to database server 306.

Returning to FIG. 2, after the wireless device transmits the recorded information to the database server (S224), method 200 stops (S226).

With the recent COVID-19 pandemic happening around the world, social distancing is becoming a norm and people in general are taking extra precautions whenever they are in close contact with other people in public. In a working environment, when a large group of people is working closely inside an office building, it becomes necessary for everyone to practice social distancing while continuing to work with one another. Additionally, companies also need to keep track of people in close contact with one another so that in case an employee becomes infected with a deadly virus, the company can easily identify all other employees who were in contact with the infected employee and take proper measures to isolate and stop the spread of the infection.

As discussed in this disclosure, the invention helps people to practice social distancing by generating alerts when an individual comes in close contact with another person. When an individual remains in close contact with another person for a predetermined time, a record of the contact, including information of the other person (such as name, employee ID, etc.) and date and time of the contact, will be saved and stored on a database server where the information can be easily retrieved for contact tracing purposes later.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wireless device for use with a second wireless device, said wireless device comprising:
   an indicator configured to provide an indication to a user;
   a memory; and
   a processor configured to execute instructions stored on said memory to cause said wireless device to:
      detect the unique identifier broadcast from the second wireless device;
      determine a distance from the second wireless device based on a unique identifier broadcast by the second wireless device; and
      instruct the indicator to provide an alert when the distance from the second wireless device is less than a predetermined distance threshold for a predetermined period of time.

2. The wireless device of claim 1, wherein said processor is configured to execute instructions stored on said memory to additionally cause said wireless device to store the unique identifier from the unique identifier broadcast when the distance from the second wireless device is less than the predetermined distance threshold for the predetermined period of time.

3. The wireless device of claim 2, wherein said processor is configured to execute instructions stored on said memory to additionally cause said wireless device to determine a contact period of time for which the second wireless device is less than the predetermined distance threshold when the distance from the second wireless device is less than the predetermined distance threshold for the predetermined period of time, and store data representing the contact period time into said memory.

4. The wireless device of claim 1, wherein said processor is configured to execute instructions stored on said memory to additionally cause said wireless device to transmit a contact notification including association information associating said wireless device to the user and contact information associating said wireless device with the second wireless device.

5. A method of using a wireless device with a second wireless device, said method comprising:
   detecting, via a processor configured to execute instructions stored on a memory, the unique identifier broadcast from the second wireless device;
   determining, via the processor, a distance from the second wireless device based on a unique identifier broadcast by the second wireless device; and
   instructing, via the processor, an indicator to alert the user when the distance from the second wireless device is less than a predetermined distance threshold for a predetermined period of time.

6. The method of claim 5, further comprising storing, via the processor and into the memory, the unique identifier from the unique identifier broadcast when the distance from the second wireless device is less than a predetermined distance threshold for a predetermined period of time.

7. The method of claim 6, further comprising:
   determining, via the processor, a contact period of time for which the second wireless device is less than the predetermined distance threshold when the distance from the second wireless device is less than the predetermined distance threshold for the predetermined period of time, and
   storing, via the processor, data representing the contact period time into the memory.

8. The method of claim 5, further comprising transmitting, via the processor, a contact notification including association information associating said wireless device to the user and contact information associating said wireless device with the second wireless device.

9. A non-transitory, computer-readable media having computer-readable instructions stored thereon, the computer-readable instructions being capable of being read by a wireless device for use with a second wireless device, wherein the computer-readable instructions are capable of instructing the wireless device to perform the method comprising:
   detecting, via a processor configured to execute instructions stored on a memory, the unique identifier broadcast from the second wireless device;
   determining, via the processor, a distance from the second wireless device based on a unique identifier broadcast by the second wireless device; and instructing, via the processor, an indicator to provide an indication to a user when the distance from the second wireless device is less than a predetermined distance threshold for a predetermined period of time.

10. The non-transitory, computer-readable media claim 9, wherein the computer-readable instructions are capable of instructing the wireless device to perform the method further comprising storing, via the processor and into the memory, the unique identifier from the unique identifier broadcast when the distance from the second wireless device is less than a predetermined distance threshold for a predetermined period of time.

11. The non-transitory, computer-readable media claim 10, wherein the computer-readable instructions are capable of instructing the wireless device to perform the method further comprising:
   determining, via the processor, a contact period of time for which the second wireless device is less than the predetermined distance threshold when the distance from the second wireless device is less than the predetermined distance threshold for the predetermined period of time, and
   storing, via the processor, data representing the contact period time into the memory.

12. The non-transitory, computer-readable media claim 9, wherein the computer-readable instructions are capable of instructing the wireless device to perform the method further comprising transmitting, via the processor, a contact notification including association information associating said wireless device to the user and contact information associating said wireless device with the second wireless device.

* * * * *